United States Patent
Cheon (10) Patent No.: US 9,678,406 B2
(45) Date of Patent: Jun. 13, 2017

(54) OPTICAL SWITCH AND OPTICAL LOGIC DEVICE

(71) Applicant: SAMSUNG ELECTRONICS CO., LTD., Suwon-si (KR)

(72) Inventor: Sang-mo Cheon, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 14/082,674

(22) Filed: Nov. 18, 2013

(65) Prior Publication Data

US 2014/0153071 A1  Jun. 5, 2014

(30) Foreign Application Priority Data

Nov. 30, 2012 (KR) .................. 10-2012-0138507

(51) Int. Cl.
*G02F 3/02* (2006.01)
*G02F 1/01* (2006.01)
*G02F 3/00* (2006.01)

(52) U.S. Cl.
CPC .............. *G02F 3/02* (2013.01); *G02F 1/0126* (2013.01); *G02F 3/00* (2013.01); *G02F 2203/10* (2013.01)

(58) Field of Classification Search
None
See application file for complete search history.

(56) References Cited

U.S. PATENT DOCUMENTS

| | | |
|---|---|---|
| 2004/0190116 A1 | 9/2004 | Lezec et al. |
| 2004/0197517 A1 | 10/2004 | Yamamoto et al. |
| 2006/0067610 A1 | 3/2006 | Wu et al. |
| 2006/0126986 A1 | 6/2006 | Liu et al. |
| 2010/0110430 A1 | 5/2010 | Ebbesen et al. |
| 2011/0075239 A1 | 3/2011 | Moiseev et al. |
| 2012/0019901 A1 | 1/2012 | Mazumder |
| 2013/0094070 A1* | 4/2013 | Mojtabaee Tabatabaee ............... G02F 3/00 359/108 |

OTHER PUBLICATIONS

EP Communication dated Mar. 25, 2014, from the European Patent Office in counterpart European Application No. 13194381.3.
Kim et al., "Bundle Beaming From Multiple Subwavelength Slits Surrounded by Dielectric Surface Gratings", Journal of Lightwave Technology, vol. 28, No. 14, Jul. 15, 2010, pp. 2023-2029.
Swillam et al., "All-optical ultrafast control of beaming through a single sub-wavelength aperture in a metal film", Optics Express, vol. 19, No. 8, Apr. 11, 2011 pp. 7856-7864.
(Continued)

*Primary Examiner* — Jennifer L. Doak
(74) *Attorney, Agent, or Firm* — Sughrue Mion, PLLC (57) ABSTRACT

Provided are an optical switch and an optical logic device. The optical switch includes a plate having a nanometer-sized thickness, a first slit formed in the plate, through which a first light passes, a second slit formed in the plate, separately from the first slit, through which a second light selectively passes, a plurality of first grooves formed on a first side of the first slit, between the first slit and the second slit, and a plurality of second grooves formed on a second side of the first slit, opposite the first side. The first light and the second light may have a phase difference and a focusing of the first light is turned on/off by controlling the second light.

26 Claims, 12 Drawing Sheets

(56) References Cited

OTHER PUBLICATIONS

Hendry et al., "Optical control over surface-plasmon-polariton-assisted THz transmission through a slit aperture", Physical Review Letters, The American Physical Society, vol. 100, No. 12, Mar. 28, 2008, pp. 123901-1-123901-4.
Lee et al., "Tunable subwavelength focusing with dispersion-engineered metamaterials in the terahertz regime", Optics Letters, vol. 35, No. 13, Jul. 1, 2010, pp. 2254-2256.
Barnes et al., "Surface plasmon subwavelength optics", Nature, vol. 424, Aug. 14, 2003, pp. 824-830.
Ebbesen et al., "Extraordinary optical transmission through sub-wavelength hole arrays", Letters to Nature, vol. 391, No. 6668, Feb. 12, 1998, pp. 667-669.
Garcia-Vidal, et al.; "Focusing light with a single subwavelength aperture flanked by surface corrugations"; Applied Physics Letters; Dec. 1, 2003; vol. 83 No. 22 pp. 4500-4502.

* cited by examiner

OPTICAL SWITCH AND OPTICAL LOGIC DEVICE

CROSS-REFERENCE TO RELATED APPLICATION

This application claims priority from Korean Patent Application No. 10-2012-0138507, filed on Nov. 30, 2012, in the Korean Intellectual Property Office, the disclosure of which is incorporated herein in its entirety by reference.

BACKGROUND

1. Field

Apparatuses consistent with exemplary embodiments of present disclosure relate to optical switches capable of controlling turning on/off light by using light and optical logic devices including the optical switches.

2. Description of the Related Art

Beam focusing is an important concept in optical science, and various optical devices may be used for beam focusing, such as beam focusing via lenses.

However, it is difficult for typical lenses to focus an incident beam to be of a size smaller than a wavelength of the incident beam. For this, methods of focusing beams that overcome diffraction limits have been developed. Among such methods, beam focusing methods using slits of several nano sizes are generally used. Also, optical devices using beam focusing nano-sized slits have been developed.

SUMMARY

One or more exemplary embodiments may provide optical switches capable of controlling turning on/off light by using light.

One or more exemplary embodiments may provide optical logic devices using optical switches capable of controlling turning on/off light by using light.

Additional exemplary aspects and advantages will be set forth in part in the description which follows and, in part, will be apparent from the description, or may be learned by practice of the presented exemplary embodiments.

According to an aspect of an exemplary embodiment, an optical switch includes a plate having a nanometer-sized thickness, a first slit formed in the plate, through which a first light passes, a second slit formed in the plate, separately from the first slit, through which a second light selectively passes, a plurality of first grooves formed on a first side of the first slit, between the first slit and the second slit, and a plurality of second grooves formed on a second side of the first slit, opposite the first side.

The first light and the second light may have a phase difference and a focus of the first light is turned on/off by turning on/off the second light.

The plurality of first grooves and the plurality of second grooves may be arranged symmetrically with respect to the first slit which is centered between the plurality of first grooves and the plurality of second grooves.

The first slit and the second slit may have tetragonal cross-sections.

The first slit and the second slit may be in a range of from about ½ to about ¹/₂₀ of a wavelength of the first light, respectively.

One or more of the plurality of first grooves and the plurality of second grooves may be formed on both sides of the plate.

The plurality of first grooves and the plurality of second grooves may have tetragonal cross-sections.

Widths of the plurality of first grooves and the plurality of second grooves may be in a range of from about ½ to about ¹/₂₀ of a wavelength of the first light, respectively.

Depths of the plurality of first grooves and the plurality of second grooves may be in a range of from about ½ to about ¹/₂₀ of a wavelength of the first light, respectively.

The first slit and the second slit may have circular cross-sections.

The plurality of first grooves and the plurality of second grooves may be arranged in the form of concentric rings with respect to the first slit.

From about three to about ten first grooves and second grooves may be provided respectively.

The first slit, the second slit, the plurality of first grooves, and the plurality of second grooves may be arranged at regular intervals.

The regular intervals may be the same as a wavelength of the first light or smaller.

The first light and the second light may have a phase difference of 180 degrees.

The number and the intervals of the plurality of first grooves and the plurality of second grooves are controlled according to one of a focal length, strength, and a wavelength of the first light.

The plate may be formed of a conductive metal or a semiconductor.

The conductive metal may be formed of at least one selected from the group consisting of Au, Ag, Cu, and Cr.

The optical switch may further include a phase difference generator for ensuring the second light has a phase difference from the first light.

According to an aspect of another exemplary embodiment, a logic circuit device includes a first optical switch, a second optical switch disposed to face the first optical switch, and a waveguide disposed between the first optical switch and the second optical switch and guiding a first output light from the first optical switch and a second output light from the second optical switch.

The first optical switch may include a first plate having a nanometer-sized thickness, a first slit formed in the first plate, through which a first light passes, a second slit formed in the first plate, separately from the first slit, through which a second light selectively passes, a plurality of first grooves formed on a first side of the first slit, between the first slit and the second slit, and a plurality of second grooves formed on a second side of the first slit, opposite the first side.

The second optical switch may include a second plate having a nanometer-sized thickness, a third slit formed in the second plate, through which a third light passes, a fourth slit formed in the second plate, separately from the third slit, through which a fourth light selectively passes, a plurality of third grooves formed on a first side of the third slit, between the third slit and the fourth slit, and a plurality of fourth grooves formed on a second side of the third slit, opposite the first side.

BRIEF DESCRIPTION OF THE DRAWINGS

These and/or other exemplary aspects and advantages will become apparent and more readily appreciated from the following description of exemplary embodiments, taken in conjunction with the accompanying drawings in which:

FIG. 12 is a view illustrating another example of a phase difference generator included in the optical switch according to an exemplary embodiment of.

DETAILED DESCRIPTION

Reference will now be made in detail to embodiments, examples of which are illustrated in the accompanying drawings, wherein like reference numerals refer to like elements throughout. In the drawings, a size or a thickness of an element may be exaggerated for clarity and convenience of description. Also, the embodiments described below are just exemplary and the present embodiments may have different forms and should not be construed as being limited to the descriptions set forth herein. Expressions such as "at least one of," when preceding a list of elements, modify the entire list of elements and do not modify the individual elements of the list.

Figure 1:
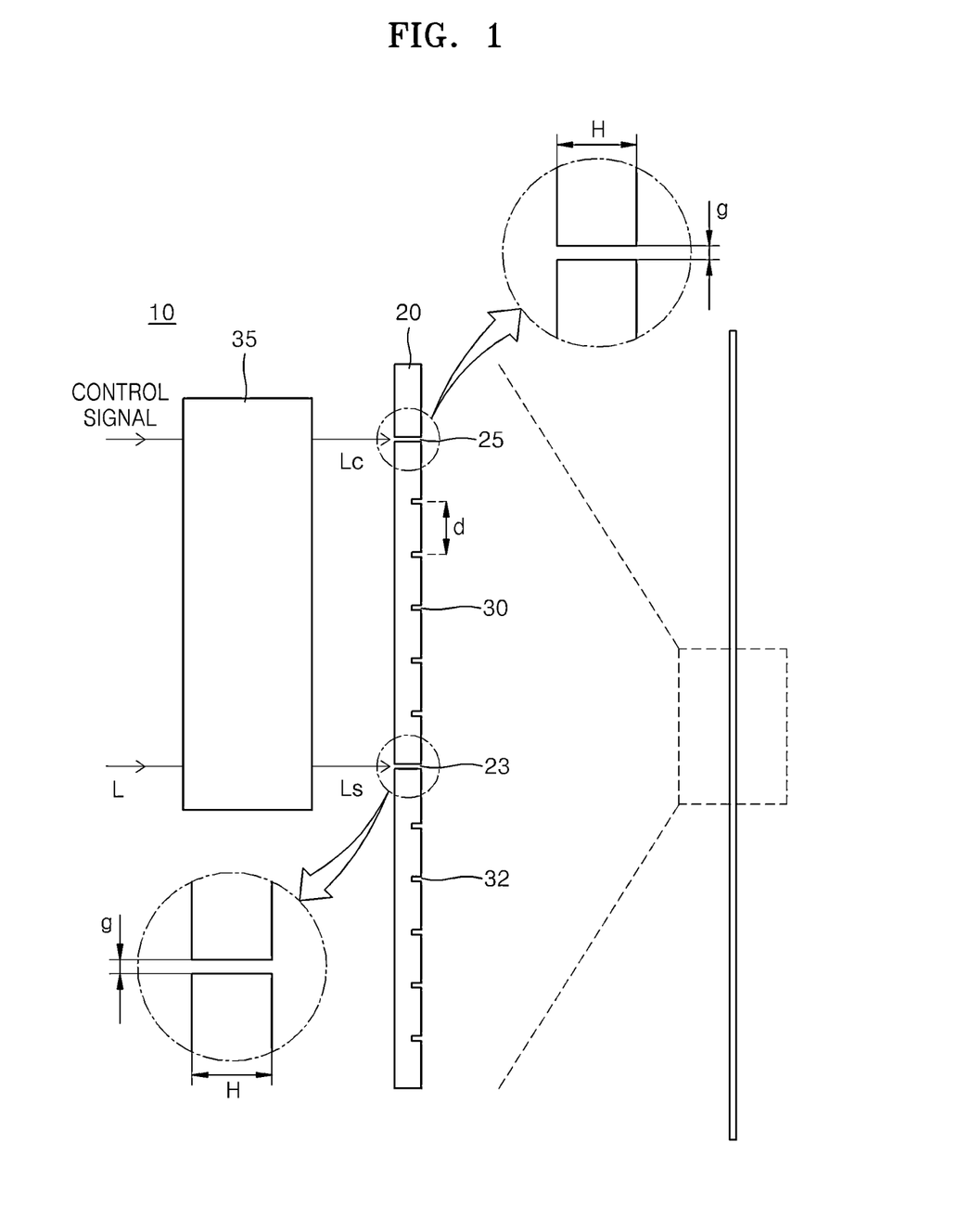
FIG. 1 is a schematic view illustrating an optical switch according to an exemplary embodiment.

FIG. 1 is a schematic view illustrating an optical switch 10 according to an exemplary embodiment.

The optical switch 10 includes a plate 20, a first slit 23 formed in the plate 20, and a second slit 25 formed in the plate 20, separately from the first slit 23. A plurality of first grooves 30 may be formed between the first slit 23 and the second slit 25, and a plurality of second grooves 32 may be formed on another side of the first slit 23, opposite the second slit. The second grooves may be formed symmetrically with respect to the first grooves, such that the first slit is centered between the first grooves and the second grooves.

The plate 20 may have a nanometer-sized thickness and may be formed of a conductive metal or a semiconductor. The conductive metal may be at least one selected from the group consisting of Au, Ag, Cu, and Cr.

Figure 2:
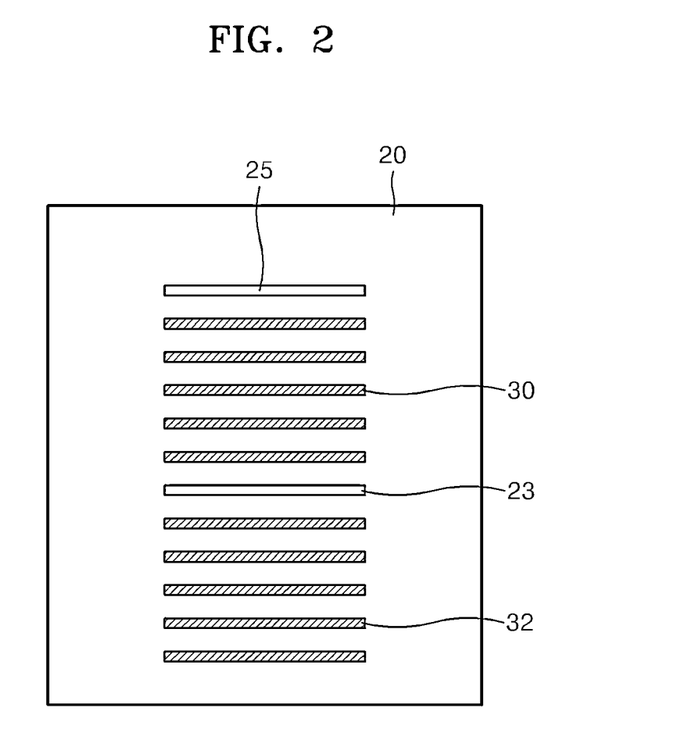
FIGS. 2 and 3 are views illustrating various examples of slits and grooves provided in the optical switch of FIG. 1.

The first slit 23 and the second slit 25 may have circular cross-sections or tetragonal cross-sections. Also, the shapes, numbers, and arrangements of the first grooves 30 and the second grooves 32 may vary in formation according to the shapes of the first slit 23 and the second slit 25. FIG. 2 is a top view illustrating the plate 20. As shown in FIG. 2, the first slit 23 and the second slit 25 may have rectangular cross-sections, and the first grooves 30 and the second grooves 32 may have rectangular shapes. With the first slit 23 centered therebetween, the first grooves and the second grooves may be arranged symmetrically with respect to one another.

A first light Ls may pass through the first slit 23, and a second light Lc may pass through the second slit 25. The first light Ls may be used as a signal light, and the second light Lc may be used as a control light. Sizes of the first slit 23, the second slit 25, the first grooves 30, and the second grooves 32 may vary according to wavelengths of the light to be incident thereon. For example, a distance d between the first grooves 30 and a distance between the second grooves 32 may be expressed as follows.

$$d \approx \lambda \sqrt{\frac{\varepsilon_1 + \varepsilon_2}{\varepsilon_1 \varepsilon_2}}$$

Herein, $\varepsilon_1$ and $\varepsilon_2$ indicate relative permittivity of the plate 20 and a medium around the plate 20 such as air. The distance d between grooves may be the same as or shorter than a wavelength λ of the first light Ls. For example, when the plate 20 is formed of metal, the distance d between grooves may be shorter than the wavelength of the first light Ls. Also, when the plate 20 is formed of photoelectric cell (PEC), the distance d between grooves may be the same as the wavelength of the first light Ls.

When the wavelength and the distance d between grooves are determined, a width a and a depth h of a groove and the number N of grooves may be determined. For example, the width a of a groove may be within a range of from ½ to 1/20 of a wavelength of the light incident thereon. For example, the depth h of a groove may be within a range of from ½ to 1/20 of a wavelength of the light. When numbers of the first grooves 30 and the second grooves 32 are 3 or more, respectively, favorable focusing performance may be achieved. For example, the numbers of the first grooves 30 and the second grooves 32 may be within ranges of from 3 to 10, respectively.

On the other hand, the first slit 23 and the second slit 25 may have a width g in a range of from ½ to 1/20 of a wavelength of the light, respectively. The first slit 23 and the second slit 25 may have depths H greater than the depth h of a groove (H>h). For example, the first slit 23 and the second slit 25 may have a depth H of 250 nm and a width g of 40 nm, respectively.

The first grooves 30 and the second grooves 32 may have tetragonal cross-sections. For example, the first grooves 30 and the second grooves 32 may have the same sizes. For example, the first grooves 30 and the second grooves 32 may have a depth h of 83.5 nm and a width a of 40 nm.

On the other hand, the numbers and the distance d of the first grooves 30 and the second grooves 32 may be controlled according to a focal length and the strength of the first light Ls. When a wavelength of the light is determined and then a focal length and the strength of a desired light are determined, the number and a distance of grooves may be determined. For example, three or more of the first grooves 30 and the second grooves 32 may be provided, respectively. For example, from 3 to 10 first grooves 30 and second grooves 32 may be provided, respectively. Also, the first slit 23, the second slit 25, the first grooves 30, and the second grooves 32 may be arranged at regular distances d. For example, the regular distance d may be 500 nm.

Figure 3:
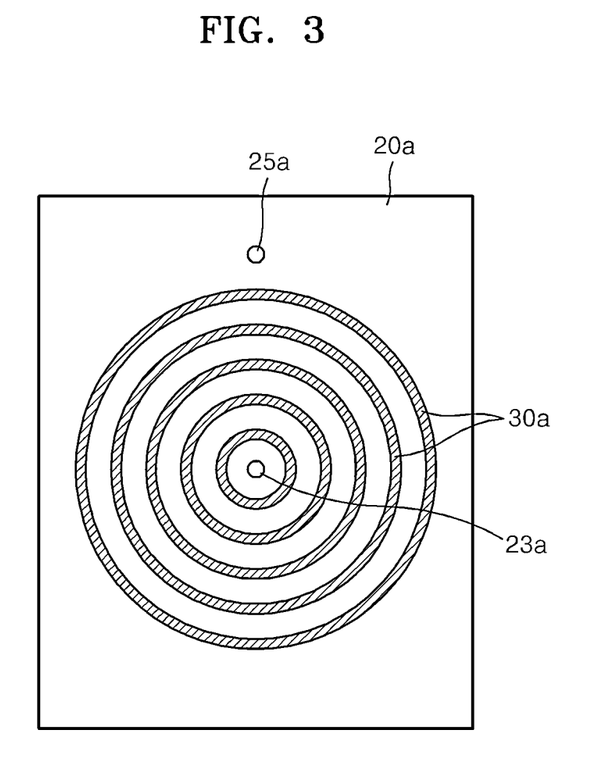

FIG. 3 is a view illustrating another example of slits and grooves. A first slit 23a and a second slit 25a formed on a plate 20a may have circular cross-sections, and first grooves and second grooves may be formed as ring-shaped grooves 30*a*, with the first slit 23*a* centered within the rings of the first and second grooves. That is, the first grooves and the second grooves may be arranged in the form of concentric rings disposed around the first slit. As shown in FIG. 3, the first slit 23*a* and the second slit 25*a* have circular cross-sections, but the first and second slits 23*a* and 25 may alternately have tetragonal cross-sections. As described above, slits and grooves may be formed having various shapes and arrangements.

The first light Ls may pass through the first slit 23, and the second light Lc may pass through the second slit 25. The first light Ls may be used as a signal light, and the second light Lc may be used as a control light. The first light Ls and the second light Lc may have a phase difference, for example, may have a phase difference of 180 degrees. To generate the phase difference between the first light Ls and the second light Lc, a phase difference generator 35 may be further included, which will be described later below.

Figure 4:
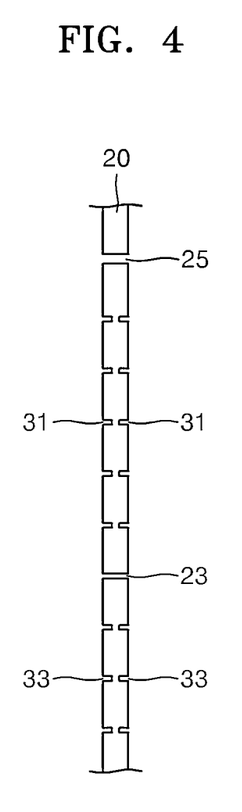
FIG. 4 is a schematic view illustrating an optical switch according to another exemplary embodiment.

Although the first grooves 30 and the second grooves 32 are disposed on one surface of the plate 20 in FIG. 1, at least one of the first grooves 31 and the second grooves 32 may be disposed on both surfaces of the plate 20 as shown in FIG. 4.

Figure 5:
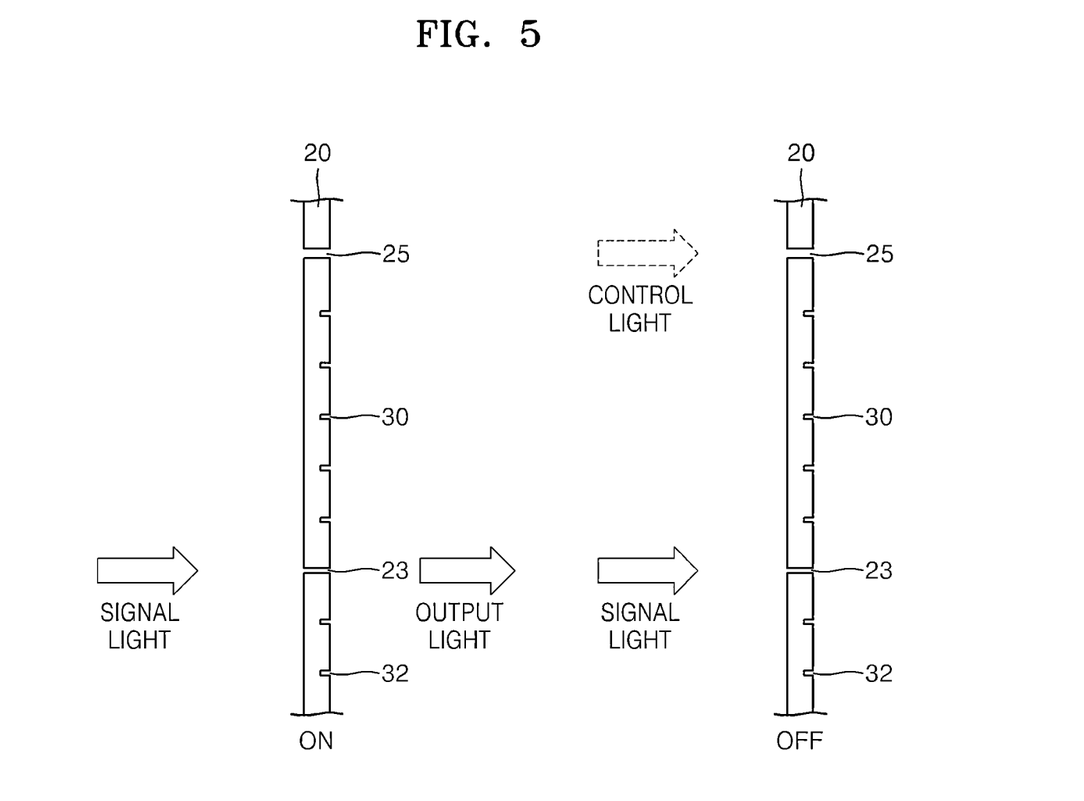
FIG. 5 is a view illustrating an operation of turning on/off the optical switch of FIG. 1.
Figure 6:
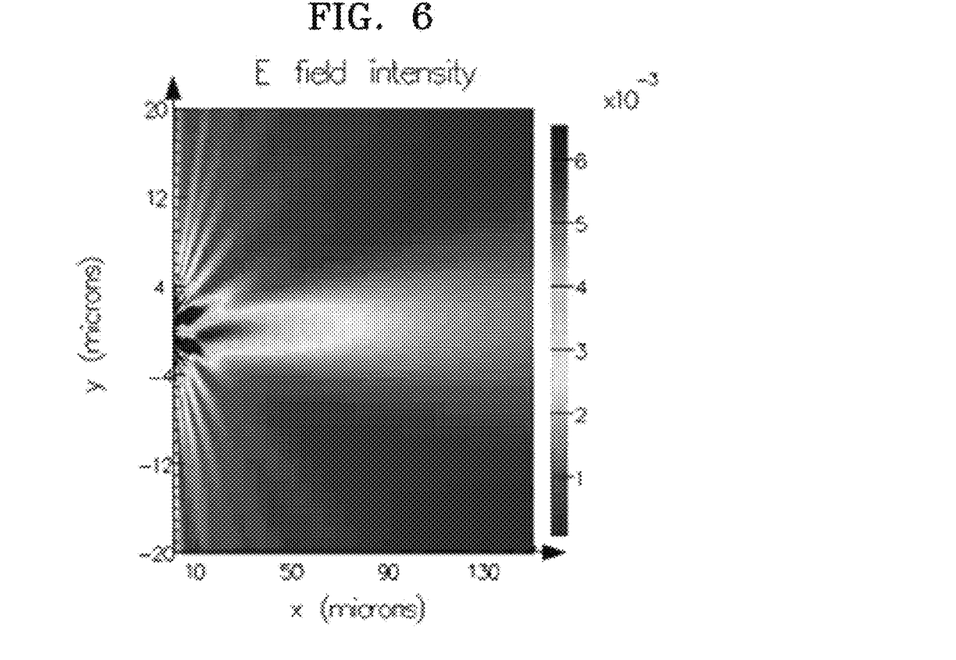
FIG. 6 is a view illustrating a focusing operation of the optical switch according to an exemplary embodiment.
Figure 8:
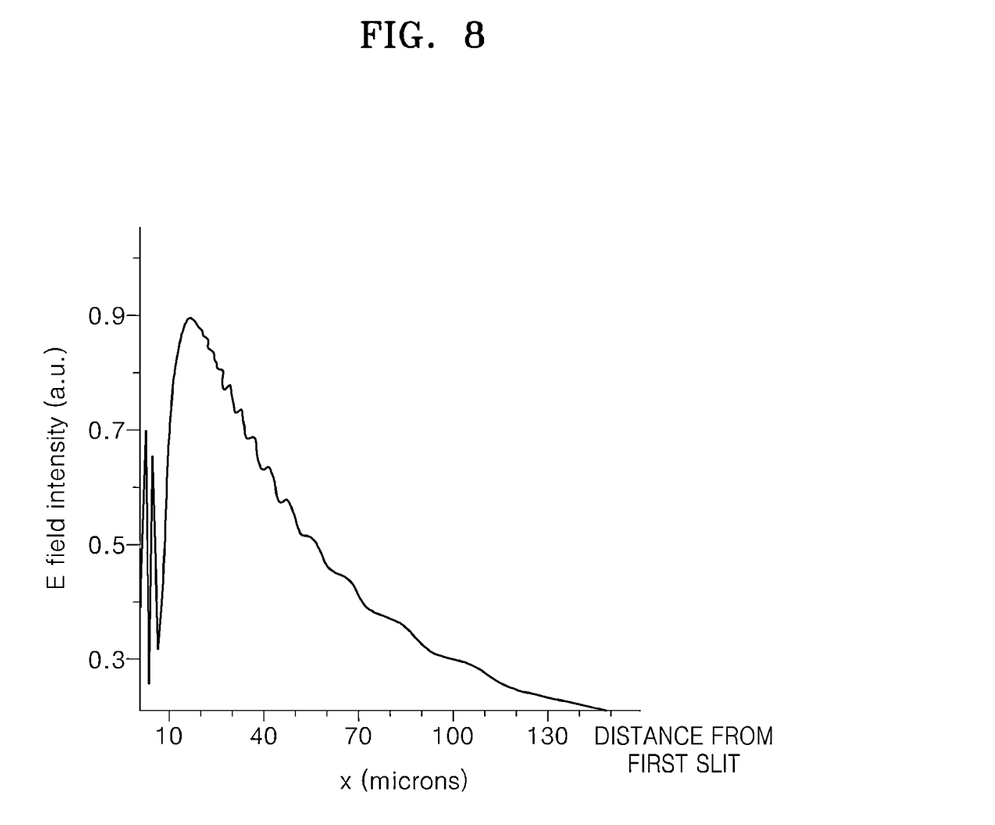
FIG. 8 is a graph illustrating the change of an electric field according to a distance from a first slit while turning on the optical switch according to an exemplary embodiment.

Hereinafter, a light switching operation using the first light Ls that is the signal light and the second light Lc that is the control light will be described with reference to FIG. 5. When the signal light Ls is turned on and the control light Lc is turned off, the signal light Ls passes through the first slit 23 and is focused, thereby turning on an output light. A dipole generated at the first slit 23 is strongly radiated, and dipoles generated at the first grooves 30 and the second grooves 32 adjacent to the first slit 23 may focus the radiated light. FIG. 6 illustrates that the signal light Ls is focused when the signal light Ls is turned on and the control light Lc is turned off. In FIG. 6, an x-axis indicates coordinates in a direction from the plate 20 to an optical axis and a y-axis indicates coordinates in a longitudinal direction of a cross-section of the plate 20 (refer to FIG. 1). Also, FIG. 8 is a graph illustrating the change in an electric field according to a distance from the first slit 23 when the signal light Ls is turned on and the control light Lc is turned off. From this graph, it may be understood that a light is focused.

When the signal light Ls is turned on and the control light is turned on, the signal light Ls passes through the first slit 23 and the control light Lc passes through the second slit 25, thereby diffusing light. In other words, a light passing through the second slit 25 diffuses a light passing through the first slit 23, thereby turning off an output light. That is, the second light Lc decreases a focusing effect by weakening the dipoles generated at the first grooves 30 and the second grooves 32 and the dipole generated at the second slit 25 diffuses the light passing through the first slit, thereby turning off the output light.

Figure 7:
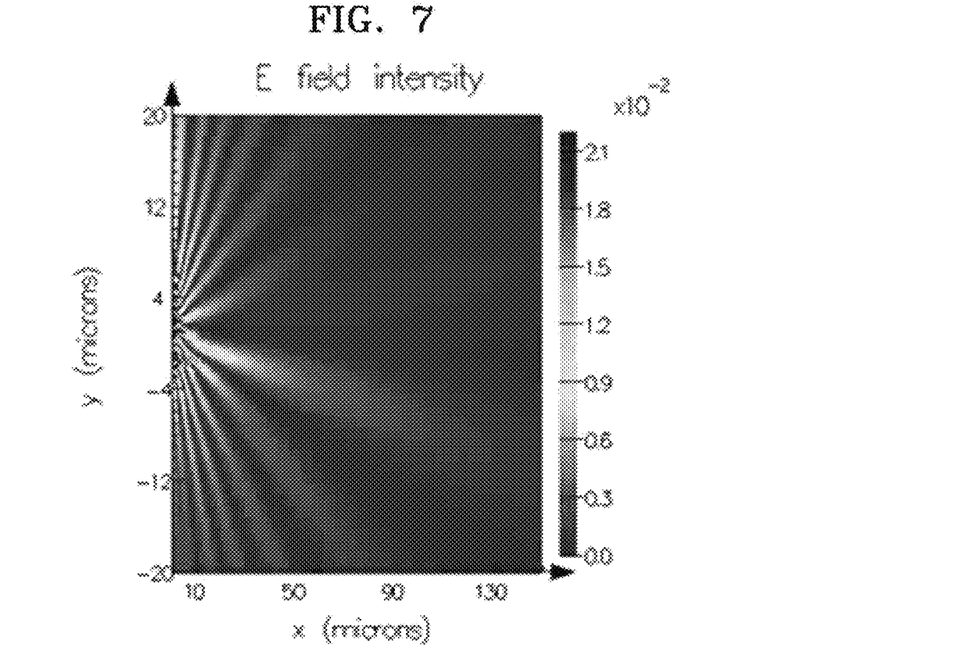
FIG. 7 is a view illustrating a diffusing operation of the optical switch according to an exemplary embodiment.
Figure 9:
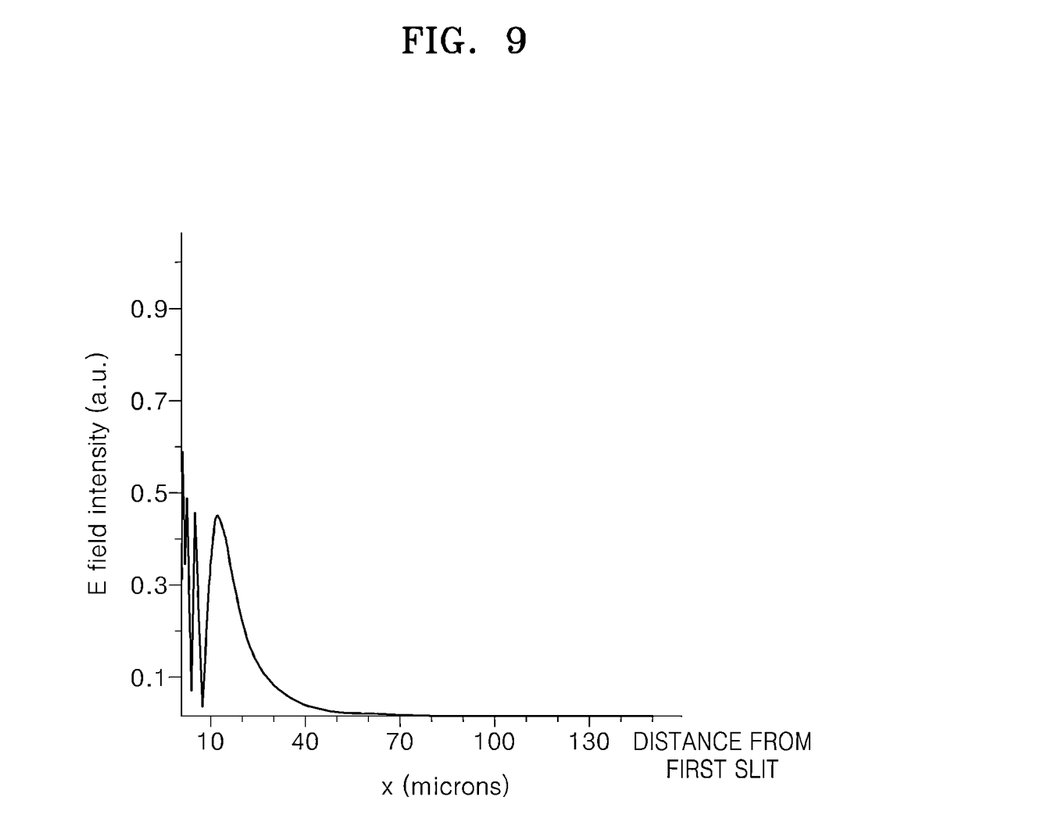
FIG. 9 is a graph illustrating the change of an electric field according to a distance from the first slit while turning off the optical switch according to an exemplary embodiment.

FIG. 7 illustrates the signal light Ls diffused when the signal light Ls is turned on and the control light Lc is turned on. FIG. 9 is a graph illustrating the change in an electric field according to a distance from the first slit 23 when the signal light Ls is turned on and the control light is turned on. Comparing the graph of FIG. 8 and the graph of FIG. 9, it may be understood that a light is diffused when the signal light Ls is turned on and the control light Lc is turned on.

Figure 10A:
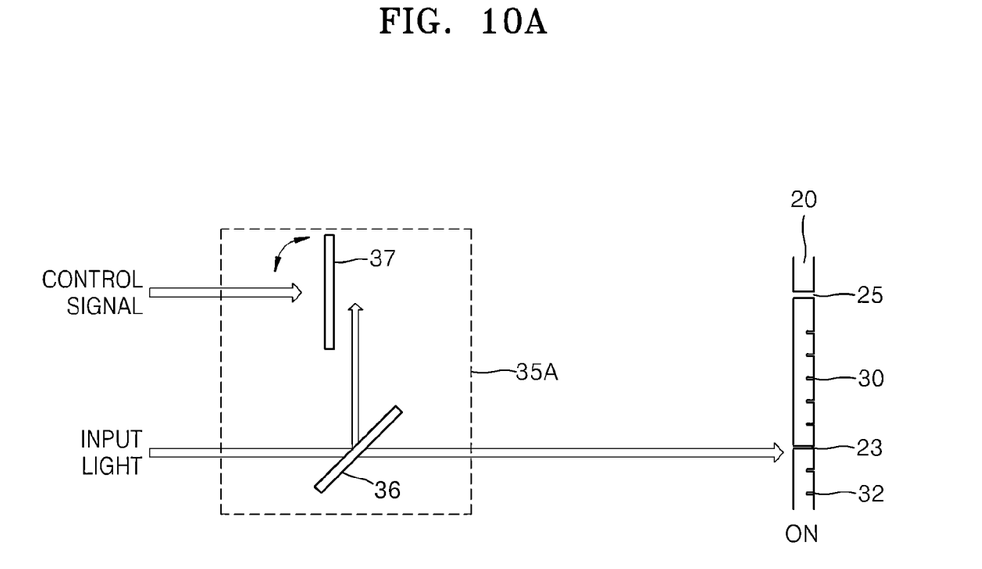
FIGS. 10A and 10B are views illustrating an example of a phase difference generator included in the optical switch according to an exemplary embodiment.
Figure 10B:
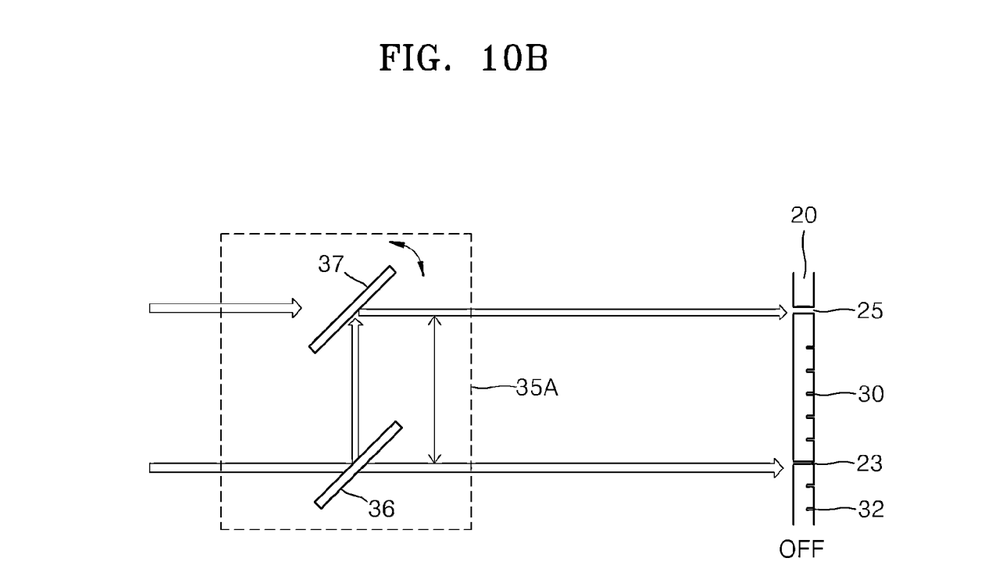

Hereinafter, there will be described phase difference generators for generating phase differences between the first light Ls and the second light Lc. Referring to FIG. 10A, a phase difference generator 35A may include a beam splitter 36 transmitting some light and reflecting other light and a mirror 37 installed to be separate from the beam splitter 36 and to be pivotable. The beam splitter 36 transmits a part of input light toward the first slit 23 and reflects another part of the input light toward the mirror 37. For example, the first light Ls that is transmitted via the beam splitter 36 may be the signal light and may propagate toward the first slit 23 and the second light Lc reflected by the beam splitter 36 may be the control light and may propagate toward the mirror 37. The mirror 37 is pivotable to control the turning on and off of the control light Lc. For example, according to a control signal of the control light Lc, the mirror 37 may be in a first position (refer to FIG. 10A) capable of allowing the second light Lc to pass thereby (as shown in FIG. 10A) or reflecting the second light Lc to a direction other than the second slit 25 or may be in a second location (refer to FIG. 10B) capable of reflecting the second light Lc, previously reflected by the beam splitter 36, toward the second slit 25 (as shown in FIG. 10B), or otherwise transmitting the second light Lc to the second slit 25. FIG. 10A illustrates a state of turning on the optical switch 10, in which an off control signal of the control light Lc may be input to the phase difference generator 35A and the mirror 37 may be pivoted to be in the first location according to the off control signal of the control light Lc. The second light Lc reflected by the beam splitter 36 goes straight and does not progress toward the second slit 25. Accordingly, only the first light Ls passing through the beam splitter 36 may pass through the first slit 23 and be focused, thereby turning on the optical switch 10.

FIG. 10B illustrates a state of turning off the optical switch 10. The second light may be used as a control light. An on control signal of the control light (the second light) Lc is input to the phase difference generator 35A and the mirror 37 may be pivoted to be in the second position according to the on control signal of the control light (the second light) Lc. The second light Lc reflected by the beam splitter 36 is reflected by the mirror 37 and may propagate toward the second slit 25. The presence of the second light Lc diffuses the first light Ls passing through the beam splitter 36, thereby turning off the optical switch 10. In FIG. 10B, a path difference D between the first light Ls and the second light Lc occurs and the phase difference between the first light Ls and the second light Lc may be embodied due to the path difference D. For example, it is possible to provide a phase difference of 180 degrees by controlling the path difference D between the first light Ls and the second light Lc.

Figure 11A:
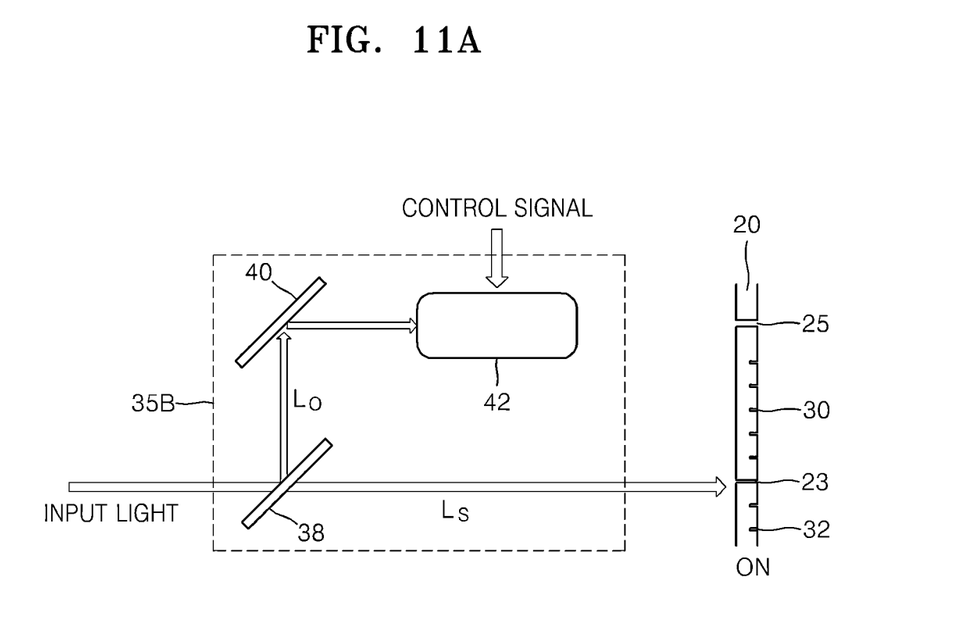
FIGS. 11A and 11B are views illustrating another example of a phase difference generator included in the optical switch according to an exemplary embodiment.
Figure 11B:
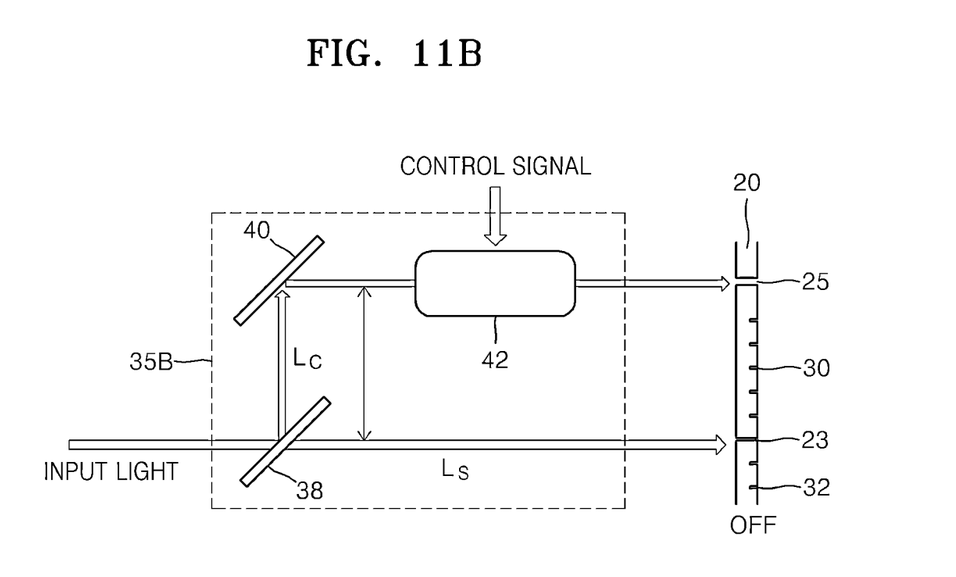

FIGS. 11A and 11B illustrate another example of a phase difference generator. A phase difference generator 35B may include a beam splitter 38 reflecting a part of input light and transmitting another part of the input light, a mirror 40 reflecting the light reflected by the beam splitter 38, and a band stop filter 42 selectively transmitting or blocking the light reflected by the mirror. The beam splitter 38 may transmit the part of the input light toward the first slit 23 and reflect the other part of the input light toward the mirror 40. For example, the first light Ls that is transmitted by the beam splitter 38 is a signal light and may propagate toward the first slit 23 and the second light Lc reflected by the beam splitter 38 is a control light and may propagate toward the mirror 40. The second light Lc reflected by the mirror 40 may pass through the band stop filter 42 or be blocked according to a control signal of the second light Lc.

FIG. 11A illustrates a state of turning on the optical switch 10, in which an off control signal of the control light Lc that is the second light may be input to the band stop filter 42 and the band stop filter 42 may block the second light Lc according to the off control signal of the control light Lc.

Accordingly, only the first light Ls passing through the beam splitter 38 passes through the first slit 23 and is focused, thereby turning on the optical switch 10.

FIG. 11B illustrates a state of turning off the optical switch 10, in which an on control signal of the control light Lc that is the second light is input to the band stop filter 42 and the band stop filter 42 allows the second light Lc to pass through and propagate toward the second slit 25. Also, the second light Lc diffuses the first light Ls passing through the beam splitter 38, thereby turning off the optical switch 10. In FIG. 11B, a path difference D between the first light Ls and the second light Lc may occur and a phase difference between the first light Ls and the second light Lc may be embodied due to the path difference D. For example, it is possible to provide a phase difference of 180 degrees by controlling the path difference D between the first light Ls and the second light Lc.

Figure 12:
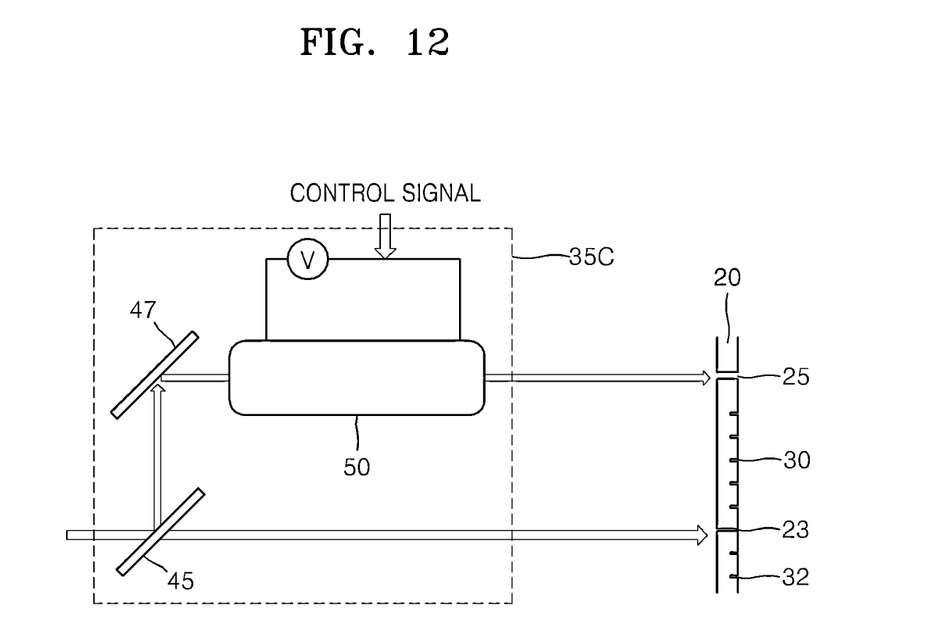

FIG. 12 illustrates another example of a phase difference generator. A phase difference generator 35C may include a beam splitter 45 reflecting a part of input light and transmitting another part of the input light, a mirror 47 reflecting the light reflected by the beam splitter 45, and an optical phase modulator 50 modulating a phase of the light reflected by the mirror 47. The beam splitter 45 may transmit the part of the input light toward the first slit 23 and reflect the other part of the input light toward the mirror 47. For example, the first light Ls that is transmitted by the beam splitter 45 is a signal light and may propagate toward the first slit 23 and the second light Lc reflected by the beam splitter 45 is a control light and may propagate toward the mirror 47. A phase difference of the second light Lc reflected by the mirror 47 may be changed by the optical phase modulator 50 according to a control signal. For example, the optical phase modulator 50 may change a phase of light by changing a refractive index of an inside material of the optical phase modulator 50 according to an electric signal. For example, the optical phase modulator 50 may be formed of liquid crystal.

For example, an off control signal of the control light Lc that is the second light is input to the optical phase modulator 50 and the optical phase modulator 50 modulates a phase of the second light Lc according to the off control signal of the second light Lc, so that a phase difference between the first light Ls and the second light Lc is 0. When the phase difference between the first light Ls and the second light Lc is 0, the first light Ls passing through the beam splitter 45 passes through the first slit 23 and is focused, thereby turning on the optical switch 10.

Also, an on control signal of the control light (or the second light) Lc is input to the optical phase modulator 50 and the optical phase modulator 150 modulates a phase of the second light Lc according to the on control signal of the second light Lc, so that a phase difference between the first light Ls and the second light Lc is 180 degrees. When the phase difference between the first light Ls and the second light Lc is 180 degrees, the second light Lc diffuses the first light Ls, thereby turning off the optical switch 10. As described above, the phase difference generator may be embodied in various ways.

The optical switch 10 according the present exemplary embodiment may perform high speed control of light by controlling turning on/off the first light by using the second light. Accordingly, it is possible to more quickly control light compared to controlling light by using an electric circuit. The optical switch 10 may be usefully applied to optical communication and may be used for devices in electric circuits such as diodes and transistors. Also, the optical switch 10 may be used as not only optical switches with respect to wavelengths within a range from about 400 to about 700 nm but also THz wave switches, microwave switches, and X-ray switches. Also, since the configuration is simple and a manufacturing process is simplified, it is easier to integrate the optical switch 10 to a nano scale level and it is possible to mass-produce it.

Figure 13:
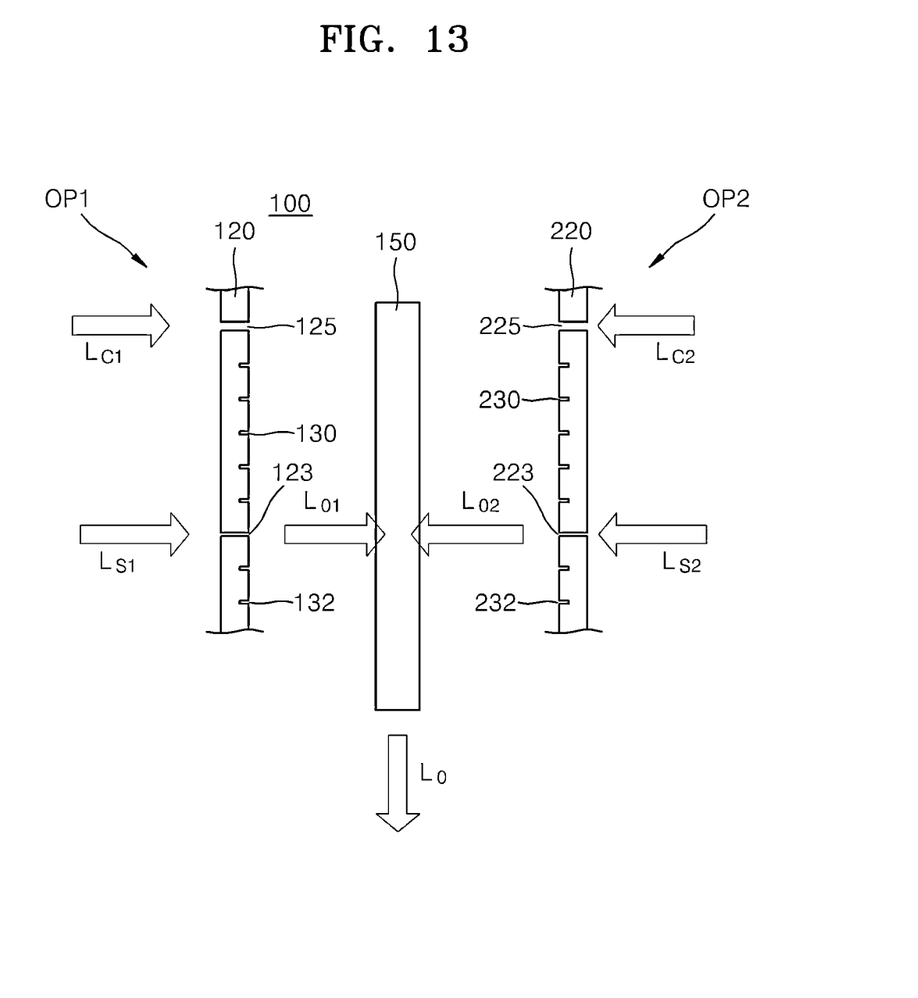
FIG. 13 is a view illustrating an optical logic device including the optical switch according to an exemplary embodiment.

FIG. 13 is a schematic view illustrating an optical logic device 100 according to an exemplary embodiment.

The optical logic device 100 may include a first optical switch OP1, a second optical switch OP2, and a waveguide 150 disposed between the first optical switch OP1 and the second optical switch OP2. The first optical switch OP1 includes a first plate 120, a first slit 123 formed on the first plate 120, and a second slit 125 formed on the first plate 120, separately from the first slit 123. A plurality of first grooves 130 may be formed between the first slit 123 and the second slit 125, and a plurality of second grooves 132 may be formed symmetrically with respect to the first grooves 130, such that the first slit 123 is centered between the first and second grooves 130 and 132.

A first light Ls1 may be incident on the first slit 123, and a second light Lc1 may be incident on the second slit 125, selectively, according to a control signal. The first light Ls1 and the second light Lc1 may have a phase difference such as 180 degrees.

The second optical switch OP2 may include a second plate 220, a third slit 223 formed on the second plate 220, and a fourth slit 225 formed on the second plate 220, separately from the third slit 223. A plurality of third grooves 230 may be formed between the third slit 223 and the fourth slit 225, and a plurality of fourth grooves 232 may be formed symmetrically with respect to the third grooves 230, such that the third slit 223 is centered between the first and second grooves 230 and 232.

A third light Ls2 may be incident on the third slit 223, and a fourth light Lc2 may be incident on the fourth slit 225, selectively, according to a control signal. The third light Ls2 and the fourth light Lc2 may have a phase difference such as 180 degrees. To generate the phase difference between the first light Ls1 and the second light Lc1 and to generate the phase difference between the third light Ls2 and the fourth light Lc2, the phase generators described above with reference to FIG. 9A to FIG. 11 may be used.

Since the first optical switch OP1 and the second optical switch OP2 have configurations and functions virtually identical to the optical switch 10 described with reference to FIG. 1, a detailed description thereof will be omitted here.

NAND outputs, resulting from operations of the first optical switch OP1 and the second optical switch OP2, are as follows.

TABLE 1

| NAND | Lc1 (on) | Lc1 (off) |
|---|---|---|
| Lc2 (on) | Output (off) | Output (on) |
| Lc2 (off) | Output (on) | Output (on) |

In the first optical switch OP1, when the second light Lc1 is incident on the second slit 125 (Lc1 (on)), the first light Ls1 passing through the first slit 123 is diffused, thereby turning off a first output light LO1. In the second optical switch OP2, when the fourth light Lc2 is incident on the fourth slit 225 (Lc2 (on)), the third light Ls2 passing through the third slit 223 is diffused, thereby turning off a second output light LO2. In this case, since both the first optical switch OP1 and the second optical switch OP2 are turned off, an output light LO may be turned off.

In the first optical switch OP1, when the second light Lc1 is incident on the second slit 125 (Lc1 (on)), the first light Ls1 passing through the first slit is diffused, thereby turning off the first output light LO1. In the second optical switch OP2, when the fourth light Lc2 is not incident on the fourth slit 225 (Lc2 (off)), the third light Ls2 passing through the third slit 223 is focused, thereby turning on the second output light LO2. In this case, since the second output light LO2 from the second optical switch OP2 is output via the waveguide 150, the output light LO may be turned on.

In the first optical switch OP1, when the second light Lc1 is not incident on the second slit 125 (Lc1 (off)), the first light Ls1 passing through the first slit 123 is focused, thereby turning off the first output light LO1. In the second optical switch OP2, when the fourth light Lc2 is incident on the fourth slit 225 (Lc2 (on)), the third light Ls2 passing through the third slit 223 is diffused, thereby turning off the second output light LO2. In this case, since the first output light LO1 from the first optical switch OP1 is output via the waveguide 150, the output light LO may be turned on.

In the first optical switch OP1, when the second light Lc1 is not incident on the second slit 125 (Lc1 (off)), the first light Ls1 passing through the first slit 123 is focused, thereby turning on the first output light LO1. In the second optical switch OP2, when the fourth light Lc2 is not incident on the fourth slit 225 (Lc2 (off)), the third light Ls2 passing through the third slit 223 is focused, thereby turning on the second output light LO2. In this case, since the first output light LO1 from the first optical switch OP1 and the second output light LO2 from the second optical switch OP2 are output via the waveguide 150, the output light LO may be turned on.

As described above, according to the one or more of the above-described exemplary embodiments, it is possible to embody an optical logic device by using optical switches. Since an optical switch is small-sized, it is possible to reduce the size of an optical logic device. Also, since a signal light may be turned on/off by using a control light, a control speed is very high and optical alignment is simplified.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:
1. An optical switch comprising:
a plate;
a first slit formed in the plate;
a second slit formed in the plate separately from the first slit;
a plurality of first grooves formed on the plate, on a first side of the first slit, between the first slit and the second slit; and
a plurality of second grooves formed on the plate on a second side of the first slit, opposite the first side,
wherein, when first light is incident on the first slit, second light is incident on the second slit, and there is a phase difference between the first light and the second light, a focusing of the first light is turned on and off by controlling the second light
wherein each of the plurality of first grooves and each of the plurality of second grooves is formed to a depth less than a depth of the plate from the first face of the plate to the second face of the plate, such that none of the plurality of first grooves and the plurality of second grooves fully penetrates the plate.

2. The optical switch of claim 1, wherein a thickness of the plate is on an order of a nanometer.

3. The optical switch of claim 1, wherein the plurality of first grooves and the plurality of second grooves are arranged symmetrically with respect to the first slit which is centered between the plurality of first grooves and the plurality of second grooves.

4. The optical switch of claim 1, wherein the first slit and the second slit have tetragonal cross-sections.

5. The optical switch of claim 4, wherein a width of the first slit and a width of the second slit are selected to be in a range of about ½ λ to about 1/20 λ, wherein λ is a wavelength of the first light.

6. The optical switch of claim 1, wherein at least the plurality of first grooves or the plurality of second grooves are formed in both faces of the plate.

7. The optical switch of claim 1, wherein each of the plurality of first grooves and each of the plurality of second grooves has a tetragonal cross-section.

8. The optical switch of claim 7, wherein a width of each of the plurality of first grooves and a width of each of the plurality of second grooves is in a range of about ½ λ to about 1/20 λ, wherein λ is a wavelength of the first light.

9. The optical switch of claim 7, wherein a depth each of the plurality of first grooves and a depth of each of the plurality of second grooves is in a range of about ½ λ to about 1/20 λ, wherein λ is a wavelength of the first light.

10. The optical switch of claim 1, wherein each of the first slit and the second slit has a circular cross-section.

11. The optical switch of claim 1, wherein the plurality of first grooves and the plurality of second grooves are arranged in the form of concentric rings formed around the first slit.

12. The optical switch of claim 1, wherein the plurality of first grooves comprises three to ten first grooves and the plurality of second grooves comprises three to ten second grooves.

13. The optical switch of claim 1, wherein the first slit, the second slit, the plurality of first grooves, and the plurality of second grooves are arranged at regular intervals.

14. The optical switch of claim 12, wherein a length of the regular intervals is less than or equal to a wavelength of the first light.

15. The optical switch of claim 1, wherein the phase difference between the first light and the second light is 180 degrees.

16. The optical switch of claim 1, wherein a number of the plurality of first grooves a number of the plurality of second grooves, and intervals between the plurality of first grooves and the plurality of second grooves are selected based on one of a focal length, a strength, and a wavelength of the first light.

17. The optical switch of claim 1, wherein the plate is formed comprises one of a conductive metal and a semiconductor.

18. The optical switch of claim 1, wherein the plate comprises at least one material selected from a group consisting of Au, Ag, Cu, and Cr.

19. The optical switch of claim 1, further comprising a phase difference generator which converts a phase of one of the first light and the second light, such that the second light has the phase difference from the first light.

20. A logic circuit device comprising:
a first optical switch;
a second optical switch facing the first optical switch; and a waveguide disposed between the first optical switch and the second optical switch, wherein the waveguide guides a first output light from the first optical switch and a second output light from the second optical switch, wherein the first optical switch comprises:
- a first plate, wherein a thickness of the first plate is on an order of a nanometer;
- a first slit formed in the first plate;
- a second slit formed in the first plate, separately from the first slit;
- a plurality of first grooves formed in the first plate, on a first side of the first slit, between the first slit and the second slit; and
- a plurality of second grooves formed in the first plate, on a second side of the first slit, opposite the first side,
- wherein, when first light is incident on the first slit, second light is incident on the second slit, and there is a phase difference between the first light and the second light, a focusing of the first light is turned on and off by controlling the second light; and wherein the second optical switch comprises:
- a second plate, wherein a thickness of the second plate is on an order of a nanometer;
- a third slit formed in the second plate;
- a fourth slit formed in the second plate, separately from the third slit;
- a plurality of third grooves formed in the second plate, on a first side of the third slit, between the third slit and the fourth slit; and
- a plurality of fourth grooves formed in the second plate, on a second side of the third slit, opposite the first side,
- wherein, when third light is incident on the third slit, fourth light is incident on the fourth slit, and there is a phase difference between the third light and the fourth light, a focusing of the third light is turned on and off by controlling the fourth light.

21. The logic circuit device of claim 20, wherein the plurality of first grooves and the plurality of second grooves are arranged symmetrically with respect to the first slit which is centered between the plurality of first grooves and the plurality of second grooves, and
wherein the plurality of third grooves and the plurality of fourth grooves are arranged symmetrically with respect to the third slit which is centered between the plurality of third grooves and the plurality of fourth grooves.

22. The logic circuit device of claim 20, wherein the plurality of first grooves comprises three to ten first grooves, the plurality of second grooves comprises three to ten second grooves, the plurality of third grooves comprises three to ten third grooves, and the plurality of fourth grooves comprises three to ten fourth grooves.

23. The logic circuit device of claim 20, wherein each of the first plate and the second plate are formed of one of a conductive metal and a semiconductor.

24. The logic circuit device of claim 23, wherein the each of the first plate and the second plate comprises at least one material selected from a group consisting of Au, Ag, Cu, and Cr.

25. The logic circuit device of claim 20, further comprising:
- a first phase difference generator which converts a phase of one of the first light and the second light, such that the second light has the phase difference from the first light; and
- a second phase difference generator which converts a phase of one of the third light and the fourth light, such that the fourth light has the phase difference from the third light.

26. A method of operating an optical switch, the method comprising:
- radiating first light onto a first slit formed in a plate, wherein the plate has a thickness on an order of a nanometer;
- radiating second light, having a phase difference with respect to the first light, onto a second slit formed in the plate; and
- turning on and off a focusing of the first light by controlling the second light, wherein the plate comprises a plurality of first grooves formed on the plate, on a first side of the first slit, between the first slit and the second slit, and a plurality of second grooves formed on the plate, on a second side of the first slit, opposite the first side; and
- wherein each of the plurality of first grooves and each of the plurality of second grooves is formed to a depth less than a depth of the plate from the first face of the plate to the second face of the plate, such that none of the plurality of first grooves and the plurality of second grooves fully penetrates the plate.

* * * * *